3,225,495
PROCESS OF PEENING METALS WITH COATED GLASS BEADS
Eduard R. de Vries, Huntingdon, Pa., assignor to Prismo Safety Corporation, Huntingdon, Pa., a corporation of Pennsylvania
No Drawing. Filed Aug. 16, 1962, Ser. No. 217,286
6 Claims. (Cl. 51—319)

The present invention relates to abrasive materials and more particularly to abrasive coated glass beads for use in polishing and peening operations.

The use of glass beads has been previously suggested for use in so-called sand blasting operations or peening or polishing operations. The use of glass beads has certain advantages over the use of powders such as silicon carbide, aluminum oxide, sand and the like. For example, the larger mass of the glass beads over the abrasive powders, renders it more easily propelled by an air blast to the necessary velocity, and further, the abrasive powders have a larger tendency to pack.

A difficulty that has been experienced in the use of glass beads for such operations has been its breakage, due to impact into small particles so that after a certain time, the mass of glass beads becomes unusable, or it becomes necessary to continuously separate the broken particles of glass beads from the unbroken glass beads.

It is an object of the present invention to provide novel coated glass beads suitable for use in polishing operations.

It is a further object of the present invention to provide a novel peening or polishing operation which utilizes a novel polishing material.

Other objects and the nature and advantages of the instant invention will be apparent from the following description.

In accordance with the present invention, improved polishing materials are obtained by coating the usual glass beads that have been used in traffic marking and peening operations with a resin composition filled with polishing particles. After curing of the resin composition and drying until the coated beads are free-flowing, the coated beads are then utilized in peening, blasting and polishing operations in the usual manner.

The coated beads in accordance with the present invention do not break up as do the uncoated glass beads and yet have all the advantages of the glass beads and the polishing particles.

The glass beads may have a diameter varying from ½ to 50 mils and are preferably coated with a slurry of a solvent solution of epoxy resin incorporating a curing agent and filled with polishing particles. The glass beads are added to the slurry and the mass is kept in continuous mechanical agitation until the solvent has evaporated and a cured hard resin coating has formed on the glass beads. To prevent the glass beads from sticking together during this coating operation, it is necessary to use an excess of glass beads. During this coating operation, heat can be applied to speed up the evaporation of the solvent and the curing of the resin. It was found that by this process, as long as the continuous mechanical agitation is applied, it is possible to coat the glass beads with a substantial layer of the polishing particles filled epoxy coating which can be used for various polishing and peening operations.

The polishing particles may be any of those commonly used in peening and polishing operations such as silicon carbide, aluminum oxide, boron carbide, tungsten carbide, titanium carbide, titanium boride, industrial diamonds and the like. The type, size, shape and amounts of polishing particles are determined by the ultimate function of the resulting beads.

A type formulation for coating the beads might be:

| | Parts by weight |
|---|---|
| Resin plus curing agent | 1 |
| Polising particles | 5 |

Although the amounts of the ingredients can be varied over a large range such as

| | Percent by weight |
|---|---|
| Resin plus curing agent | 5–85 |
| Polishing particles | 15–95 |

A specific example of the invention is as follows:

| | Parts by weight |
|---|---|
| Epoxy resin | 100 |
| Diethylene triamine curing agent | 10 |
| Silicon carbide particles | 500 |

Another example of a suitable coating composition for the glass beads is:

| | Parts by weight |
|---|---|
| Epoxy resin | 220 |
| Metaphenylene diamine | 36 |
| Aluminum oxide particles | 579 |

Resins other than epoxy resins may be used. For example, the resin may be condensation products of aldehydes and particularly formaldehydes with phenols, ureas, and melamine and other thermosetting resins which solidify rapidly.

The relative proportions of the polishing particles filled resin coating composition to the glass beads is not critical so long as the glass beads are in excess so as to yield a free-flowing product after curing. It was found that 2–12 parts of the resin composition for 100 parts of the glass beads worked satisfactorily.

The viscosity of the filled resin composition can be controlled by addition of a solvent such as an alcohol, kerosene, toluene, naphtha, xylene and the like. Viscosity can also be controlled by the addition of reactive diluents such as allyl glycidyl ether, butyl glycidyl ether, phenyl glycidyl ether, styrene oxide and the like.

The epoxy resins employed in accordance with the present invention are commonly referred to as poly glycidyl ethers of polyhydric alcohols and glycidyl ethers of bis-phenols, characterized by the following general formula:

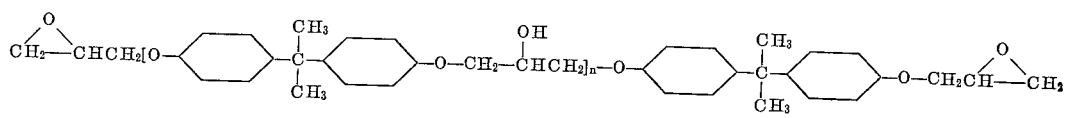

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corporation under the tradenames of Epons. Epon 828, for example, has a melting point of 8–12° C. and an epoxide equivalent ranging between 190–210. By the epoxide equivalency is meant the average number of ,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclodiepoxy carboxylate resin may be used which is sold by Union Carbide and Carbon Co. as Epoxide 201.

When an epoxy resin is used as the binder, a heat sensitive catalyst may be used which yields a composition that is stable at room temperatures and which cures when heated. Such a catalyst is a boron fluoride amine complex.

Coated glass beads in accordance with this invention can be used for various types of polishing and peening operations. The effect obtained is intermediate between that obtained by the use of uncoated glass beads and that obtained using loose polishing particles. There is substantially less breakage than is obtained with the uncoated glass beads. The coating on the glass beads of this invention gives a certain elasticity to the impact that is not obtained with uncoated glass beads. The impact is cushioned by the flexible resin coating which is around the glass bead. Even though the polishing particles are still present, they are now coated with the resin layer and this will give a different sort of impact where the resin layer will wear down together with the polishing powder.

Another modification of the invention is to utilize very soft lubricant particles in the resin coating as the polishing particles instead of the very hard abrasive particles. For example, graphite flakes or powder could be incorporated in the glass bead resin coating layer. Glass beads coated with graphite-resin compositions will yield a lubricating action upon metals when used as the polishing agent, and are particularly suited for use in cleaning operations especially for polishing of very soft metals.

Thus, it is seen that the flexibility and hardness of the resin composition coating for the glass beads can be varied as desired as well as the size, shape and hardness of the inorganic particles incorporated in the resin layer. This permits many variations to yield desirable effects when polishing or peening metals either for surface treatment, improving surface hardness or cleaning operations.

It will be obvious to those skilled in the art that various changes may be made without departing from the spirit of the invention and therefore the invention is not limited to what is described in the specification, but only as indicated in the appended claims.

What is claimed is:

1. A process of peening metals which comprises propelling free-flowing polishing material against said metal in a blast of air, said polishing material comprising spherical glass beads of a diameter of approximately ½–50 mils having a thin coating thereon of a cured thermosetting resin binder containing polishing particles embedded therein.
2. A process in accordance with claim 1 wherein the polishing particles are graphite.
3. A process in accordance with claim 1 wherein the polishing particles are silicon carbide.
4. A process in accordance with claim 1 wherein the binder is a cured epoxy resin composition and the weight of polishing particles in the coating is greater than the weight of the binder.
5. A process in accordance with claim 4 wherein the polishing particles are graphite.
6. A process in accordance with claim 4 wherein the polishing particles are silicon carbide.

References Cited by the Examiner

UNITED STATES PATENTS

| | | | |
|---|---|---|---|
| 2,574,971 | 11/1951 | Heltzer | 106—241 |
| 2,806,509 | 9/1957 | Bozzacco et al. | 260—37 |
| 2,952,192 | 9/1960 | Nagin | 260—37 |
| 3,020,140 | 2/1962 | Bluth | 51—308 |
| 3,046,851 | 7/1962 | Vries | 260—37 |
| 3,052,650 | 9/1962 | Wear et al. | 260—47 |
| 3,098,056 | 7/1963 | Schnell et al. | 260—37 |

ALFRED L. LEAVITT, *Primary Examiner.*

LESLIE H. GASTON, MORRIS LIEBMAN, ALEXANDER H. BRODMERKEL, *Examiners.*